United States Patent [19]

Gerbrandt

[11] Patent Number: 5,596,868
[45] Date of Patent: Jan. 28, 1997

[54] SWATH TURNER

[76] Inventor: Harold F. Gerbrandt, Box 115, Waldeck, Saskatchewan, Canada, S0H 4T0

[21] Appl. No.: 492,874

[22] Filed: Jun. 20, 1995

[30] Foreign Application Priority Data

Jun. 20, 1994 [CA] Canada ................................ 2126277

[51] Int. Cl.⁶ ................................................ A01D 84/00
[52] U.S. Cl. .................................................. 56/365; 56/370
[58] Field of Search ............................ 56/365, 370, 378, 56/375

[56] References Cited

U.S. PATENT DOCUMENTS

| | | |
|---|---|---|
| 2,609,651 | 9/1952 | Cymara . |
| 2,636,335 | 4/1953 | Whitney . |
| 2,679,720 | 6/1954 | Cymara . |
| 3,084,497 | 4/1963 | Reilly . |
| 3,496,713 | 2/1970 | Reinhardt et al. . |
| 4,403,468 | 9/1983 | Yoder ........................ 56/370 |
| 4,738,092 | 4/1988 | Jennings ................... 56/370 X |
| 4,809,490 | 3/1989 | Swanson ................... 56/370 |
| 4,926,625 | 5/1990 | Laquerre .................. 56/366 X |

FOREIGN PATENT DOCUMENTS 887934  12/1971  Canada .

*Primary Examiner*—Terry Lee Melius
*Attorney, Agent, or Firm*—Murray E. Thrift; Adrian D. Battison

[57] ABSTRACT

A swath turner for inverting a swath or windrow of cut crop has a pickup followed by a moldboard. The moldboard extends rearwardly from one side of the pickup and across the direction of travel. It engages one side of the swath or windrow as it leaves the pickup discharge and inverts the swath or windrow before it falls on the ground. As the inverted swath or windrow is deposited onto the ground, the tail end of the moldboard forces it down on the ground. A swath setter may follow the inverter to set the swath firmly to avoid subsequent wind losses.

3 Claims, 2 Drawing Sheets

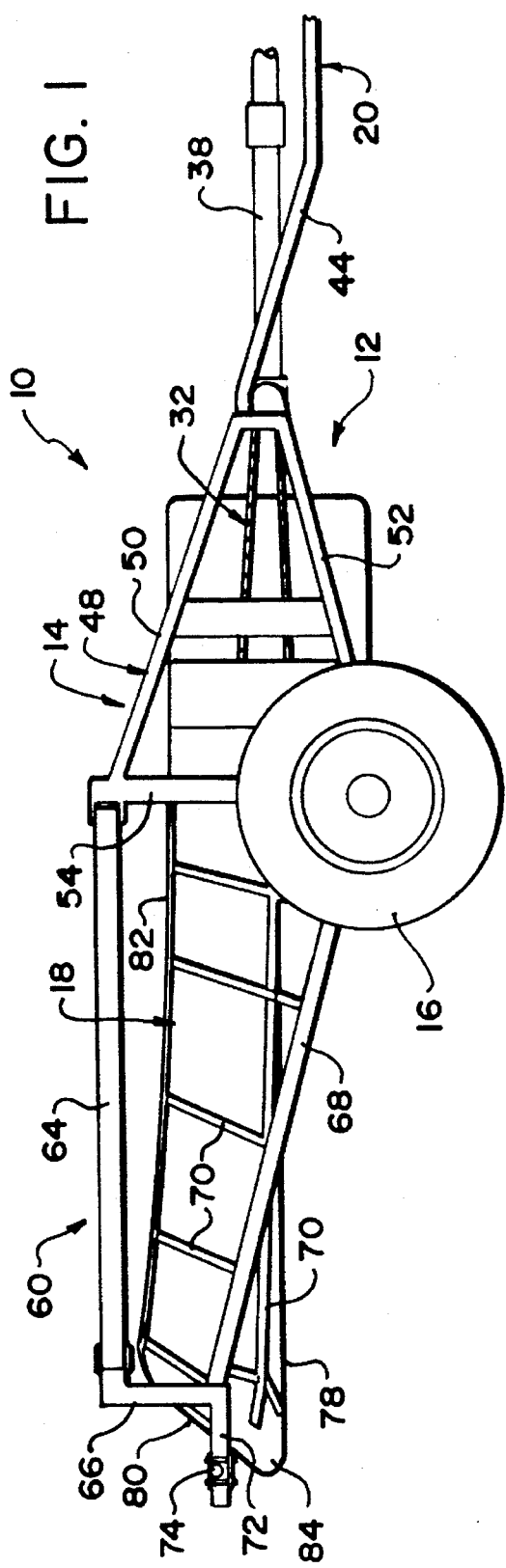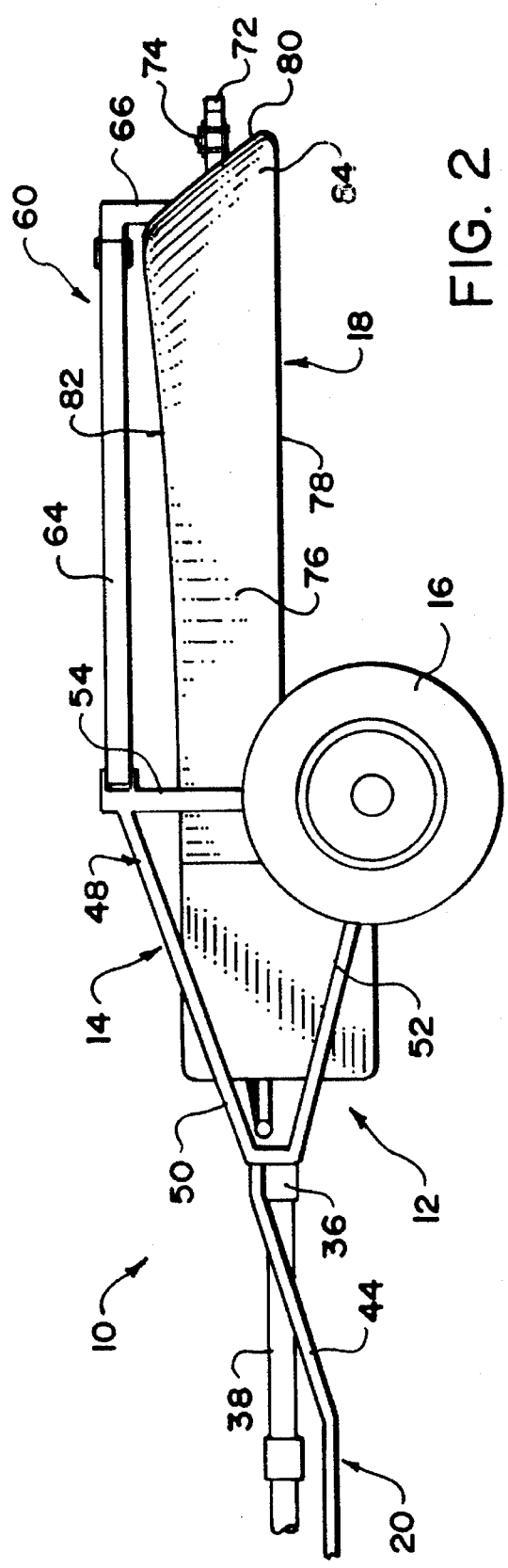

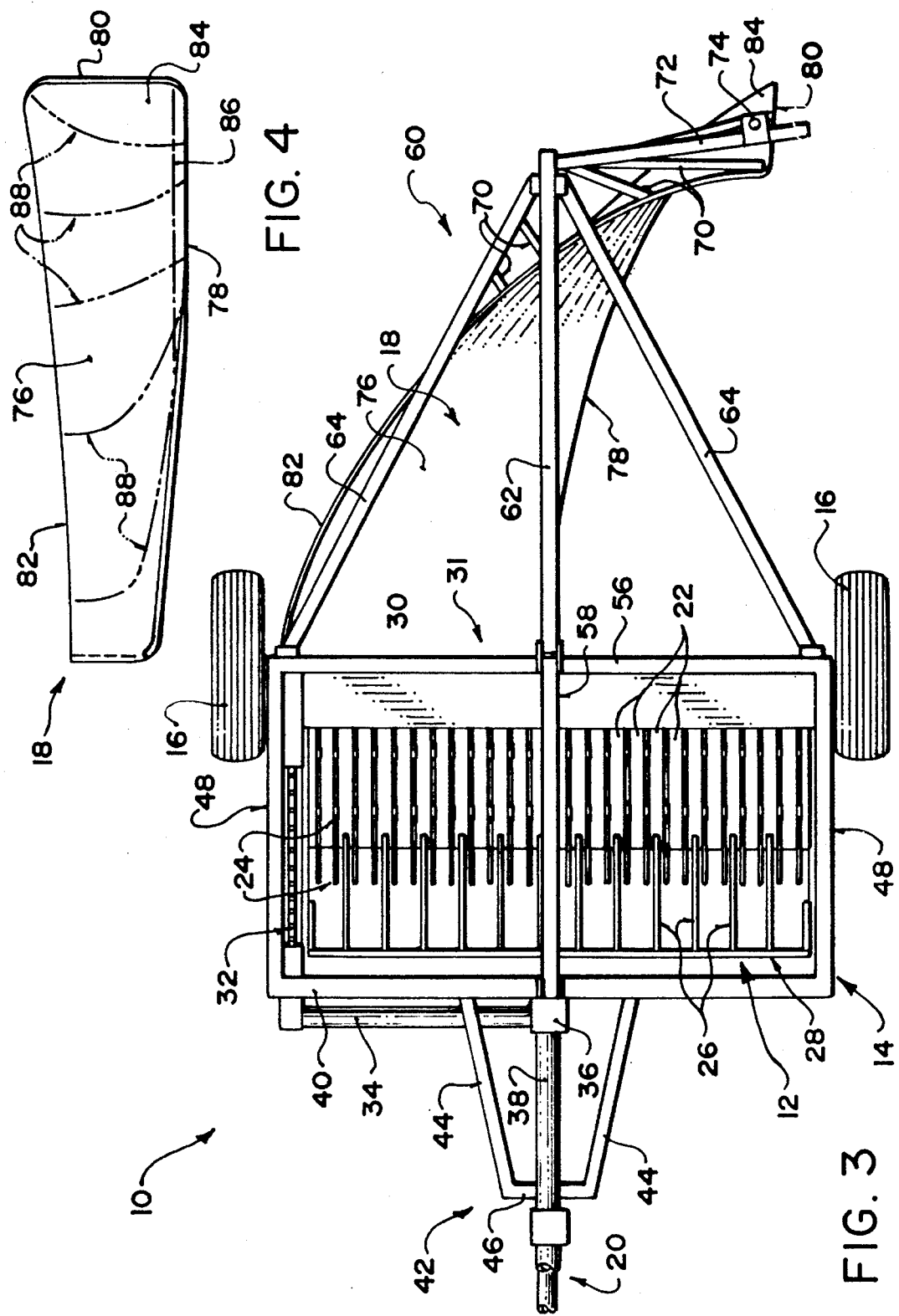

SWATH TURNER

FIELD OF THE INVENTION

The present invention relates to swath or windrow turning and more particularly to a swath or windrow turner of the moldboard type.

BACKGROUND

It is often desirable to invert swaths or windrows of cut crops to ensure more uniform drying of the crop and faster drying after a rainfall.

Various machines currently used for this purpose cause significant crop losses due to the very aggressive action of the pickup or turning apparatus. Additionally, the swath or windrow is often twisted or bunched during turning, causing problems in the harvesting operations that follow. The known machines are generally not capable of high speed operation.

The present invention relates to an apparatus and method that ameliorate the difficulties with the known machines.

SUMMARY

According to the present invention there is provided a swath turner for inverting a swath of cut crop as the turner advances in a direction of travel along the swath, said swath turner comprising:

pickup means having a front pickup end and a rear delivery end with two sides spaced apart transversely of the direction of travel;

a moldboard extending rearwardly from one of the sides of the delivery end of the pickup means and across the direction of travel, the moldboard having a concavely-curved leading face with a bottom edge that is substantially horizontal and that extends in a concave curve from a position spaced inwardly from and below said one of the sides of the delivery end of the pickup means to a trailing end of the moldboard, and a top edge that extends in a concave curve from a position above said one of the sides of the delivery end of the pickup means to the trailing end of the moldboard.

According to another aspect of the present invention there is provided a method of inverting a swath or windrow of cut crop, said method comprising:

picking up the crop with a pickup traveling along the swath or windrow;

delivering the crop from the pickup to a moldboard at one side of the swath or windrow;

engaging one side of the swath with the moldboard and lifting and displacing said one side of the swath or windrow across the direction of travel while the swath or windrow remains above ground level; and depositing the inverted swath or windrow on the ground.

The moldboard turner thus engages one side of the swath or windrow coming off the pickup and causes it to rise and move across the path of travel. This causes the swath or windrow to invert completely before it is deposited on the ground. The structure of the swath or windrow is not disturbed to any great extent.

It has been found that the swath or windrow will be fluffed slightly in the inversion process. Where desired, this can be controlled with a swath-setting roller or other pressing apparatus towed behind or attached to the moldboard.

In operation, the speed of the apparatus is sufficient that the swath or windrow coming off the pickup discharge passes along the front of the moldboard and is inverted before it is allowed to contact the ground. This prevents the production of ground-induced shear forces in the swath or windrow, which disrupts its integrity.

It is preferred that at the trailing end of the moldboard, the moldboard slopes upwardly and forwardly. This provides a "tail" at the bottom the moldboard that pushes the inverted swath or windrow onto the ground to complete the inversion process.

BRIEF DESCRIPTION OF THE DRAWINGS

In the accompanying drawings, which illustrate an exemplary embodiment of the present invention:

FIG. 1 is a side view of the apparatus;

FIG. 2 is an opposite side view of the apparatus;

FIG. 3 is a top view of the apparatus; and

FIG. 4 is a front view of the moldboard.

DETAILED DESCRIPTION

Referring to the accompanying drawings, there is illustrated a swath or windrow turner 10 that includes a tine-type pickup 12 carried on a frame 14 in turn supported on the ground by two support wheels 16 on opposite sides of the frame. A moldboard 18 extends rearwardly behind the pickup 12. At the front end of the frame is a tongue 20 for coupling the turner to a conventional tractor drawbar.

The pickup 12 includes a set of parallel, arcuate pickup slats 22 spaced to provide gaps for the rotation of tines 24 mounted on a horizontal rotor (not shown). Hold down fingers 26 spaced across the pickup are mounted on a crossbar 28 and extend over the top of the slats 22. Immediately behind the slats 22, at the top of the pickup is a transition plate 30, the rear end of which defines the discharge end 31 of the pickup.

The tine-carrying rotor is driven by a chain drive 32 at one side of the pickup. The chain drive is itself driven by a lateral shaft 34 connected to the output of a gearbox 36. The input of the gearbox is driven by a power takeoff shaft 38 from the power takeoff of a towing tractor.

The frame 14 includes a front cross member 40 carrying the gearbox 36 and the shaft 34. At the centre of the cross member 440 is a tongue subframe 42 with two forwardly-convergent side members 44 and a cross member 46. This subframe carries the tongue 20. On opposite sides of the turner are triangular side frames 48. Each of these includes a top member 50 and a bottom member 52 diverging rearwardly to a rear upright 54 at the discharge end of the pickup. The side frames are connected at the intersection of the top members 50 and uprights 54 by a cross member 56. A similar cross member joins the lower ends of the upright 54, which supports the axles for the two wheels 16.

A centre frame member 58 extends from the centre of the front cross member 40 to the centre of the top cross member 56.

Behind the side frames 48 is a moldboard support subframe 60. This includes a centre member 62 projecting to the rear from the centre of the top cross member 56 and two convergent side members 64 extending from the ends of the cross member 56 to meet at the end of the centre member 62. A vertical member 66 extends downwardly from the junction of the members 62 and 64.

Along the outer or back side of the moldboard is a lower side member 68. This is connected to the lower rear cross member joining the side frames 44 and extends upwardly and rearwardly to the vertical support 66. This subframe, especially the lower side member 68 carries a number of braces 70 that support the moldboard 18. The vertical member 66 is also connected to a towing arm 72 that extends across the back of the moldboard and carries a hitch ball 74 for connection to the tongue of a following swath setter.

The moldboard 18 has a concave front face 76 that extends rearwardly from one of the sides of the delivery end of the pickup and across the direction of travel. The bottom edge 78 of the moldboard is, in use, generally horizontal. It extends in a concave curve from a position midway between the sides of the pickup discharge end approximately one half the width of the pickup discharge end to the trailing end 80 of the moldboard. The top edge 82 of the moldboard extends in a curve from a position above the discharge end of the pickup, at one of its sides, across the direction of travel to the trailing end 80 of the moldboard. At the trailing end, the moldboard slopes upwardly from the bottom to the front to form a tail section 84 at the lower corner that serves to force the inverted swath or windrow down onto the ground as it comes off the moldboard.

The centre line of the direction of travel is drawn on the moldboard at 86, while lines 88 illustrate intersections of the front surface 76 of the moldboard with vertical planes perpendicular to the direction of travel.

In use of the apparatus, it is driven forwardly along a swath or windrow. The tines of the pickup lift the swath or windrow and deliver it off the delivery end of the pickup. The speed of delivery is sufficient that one edge of the swath or windrow will come into contact with the moldboard leading face and will be lifted and turned across the direction of travel, thus inverting the entire swath or windrow by the time it reaches the trailing end of the moldboard, without the swath or windrow coming into contact with the ground. As it leaves the trailing end of the moldboard, the tail section forces the inverted swath or windrow onto the ground at a position beside the path that it originally occupied. Where desired, a trailing swath setter, either a roller or a panel-type swath setter may be hitched to the hitch ball 74 to be towed behind the moldboard to set the swath. If desired, a swath setter may also be mounted directly on the turner behind the moldboard.

While one embodiment of this invention has been described in the foregoing, it is to be understood that other embodiments are possible and are intended to be included within the scope of the appended claims. It is, for example, possible to use pick-up devices other than the tine type pick-up used in the preferred embodiment. Likewise the power take off drive is not essential, it being possible to drive the inverter pick-up with a ground drive, hydraulics or any other suitable drive. The moldboard as illustrated and described is sheet metal supported using a framework and bracing. Other constructions, using other materials and other support arrangements, or no separate support structure where the materials are appropriate, may be employed. The invention is therefore to be considered limited solely by the scope of the appended claims.

I claim:

1. A swath turner for inverting a swath of cut crop as the turner advances in a direction of travel along the swath, said swath turner comprising:

pickup means having a front pickup end and a rear delivery end with two sides spaced apart transversely of the direction of travel;

a mold board extending rearwardly from one of the sides of the delivery end of the pickup means and across the direction of travel towards the other side, the mold board having a concavely-curved leading face with a bottom edge that is substantially horizontal and that extends in a concave curve from a position spaced inwardly from and below said one of the sides of the delivery end of the pickup means to an upright trailing edge at a trailing end of the mold board, and a top edge that extends in a concave curve from a position above said one of the sides of the delivery end of the pickup means to the upright trailing edge of the mold board.

2. A turner according to claim 1 wherein the bottom edge of the mold board has a leading end that is positioned below the discharge end of the pickup, and the bottom edge extends across substantially one half of the distance between the sides of the discharge end of the pickup.

3. A turner according to claim 2 wherein the upright trailing edge of the mold board slopes upwardly and forwardly in the direction of travel.

* * * * *